United States Patent Office 3,444,210
Patented May 13, 1969

3,444,210
SECONDARY 2-AMINOMETHYLBENZODIOXANE DERIVATIVES
Hendrik Durk Moed, Volkert Claasen, and Jan van Dijk, Weesp, Netherlands, assignors to North American Philips Company, Inc., New York, N.Y., a corporation of Delaware
No Drawing. Application Aug. 26, 1965, Ser. No. 482,938, now Patent No. 3,324,143, dated June 6, 1967, which is a continuation-in-part of application Ser. No. 293,829, July 9, 1963. Divided and this application Aug. 10, 1966, Ser. No. 578,955
Claims priority, application Netherlands, July 20, 1962, 281,245
Int Cl. C07d 13/00
U.S. Cl. 260—340.5          1 Claim This application is a division of application Ser. No. 482,938, filed Aug. 26, 1965, now U.S. Patent 3,324,143, which is a continuation-in-part of copending application Ser. No. 293,829, filed July 9, 1963, now abandoned.

This invention relates to new secondary 2-aminomethyl-benzodioxane derivatives and more particularly to compounds according to Formula I

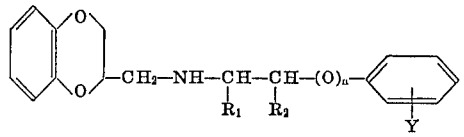

and their salts, wherein
  $R_1$ is a hydrogen atom or a methyl group,
  $R_2$ is a hydrogen atom or a hydroxyl group,
  $n$=zero or 1, provided that, if $R_2$ is a hydroxyl group, $n$=zero, and Y represents one or two hydroxy- or methoxy-groups, and compounds according to the Formula I wherein Y is methylenedioxy.

These novel compounds exhibit important pharmacological activities. They exhibit a strong sympatolytical activity and are therefore usable, for example for the treatment of excessive blood pressure.

More particularly, the new compounds, according to the invention, exhibit a surprisingly strong action on the central nerve system and notably a prolonged and strong centrally depressing action, more specifically a tranquillizing action.

These novel compounds exhibited a strong sedating action, together with a very small neurotoxicity, in pharmacological tests with mammalia.

In the table below, the activity of compounds according to the invention is compared with that of some known benzodioxane derivatives in such a pharmacological test.

In this test the potentiation of the known narcotic hexobarbital 5-($\Delta^{1,2}$-cyclohexenyl)-5-methyl - N - methyl-barbituric acid was investigated for the compounds to be tested.

The active substance to be tested was administered intraperitoneally to a number of mice, half an hour before administering the dose of hexobarbital which in itself is not narcotic, and such a dose of the active substance to be tested was measured as was sufficient to produce the hexabarbital narcosis with 50% of the animals: the efficiency dose as indicated by $ED_{50}$ in the table.

TABLE

| Compounds tested | $ED_{50}$ |
|---|---|
| 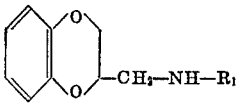 $R_1=$ | |
| —CH.CH₃—CH₂—⟨benzene⟩—O—CH₂—O (methylenedioxy) | 6 |
| —CH.CH₃—CH₂—⟨benzene⟩—OH | 2.7 |
| —CH.CH₃—CH.OH—⟨benzene⟩—OH | 3.7 |
| —CH₂—CH₂—⟨benzene⟩—OH | 4 |
| —CH₂—CH₂—O—⟨benzene⟩—OCH₃ | 5 |
| —CH₂—CH₂—⟨benzene⟩—OH | 6.8 |
| —CH.CH₃—CH₂—⟨benzene⟩—OCH₃ | 9.3 |
| —CH.CH₃—CH₂—⟨benzene⟩—OCH₃ | 20.0 |
| —CH₂—CH₂—O—⟨benzene⟩—OH | 13.3 |
| —CH₂—CH₂—⟨benzene⟩(OH)—OH | 10.0 |
| —CH₂—CH₂—⟨benzene⟩(OCH₃)—OCH₃ | 6.8 |
| —CH₂—⟨benzene⟩ (known) | 35 |
| —CH₂—CH₂—CH₂—OCH₃ (known) | 11 |

More particularly those compounds according to Formula I and their salts for which $n$=0 and Y is a p-hydroxy group have been found to have a very high activity.

Both the free bases and salts of base compounds according to the invention with pharmaceutically acceptable acids may be used for the manufacture of pharmaceutical preparations. Such non-toxic acid addition salts may be for example, the salts of the aminomethylbenzodioxane bases with hydrochloric acid, hydrobromic acid, sulphuric acid, phosphoric acid, sulphamine acid, tartaric acid, citric acid and acetic acid.

The pharmacologically active substances may be worked in any known manner into pharmaceutical preparations, for example, tablets, dragées, suppositories or injecting liquids by mixing with, or dissolving in, solid or liquid carrier materials usually employed in pharmacy such as, for example, starch, talc powder, milk sugar, gelatine, sodium-carboxymethylcellulose, magnesium stearate and/or mixtures thereof as solid carrier materials and, for example, water made isotonically with blood with the aid of salt, or water mixed with, for example, glycerine as a liquid carrier.

The novel compounds of our invention may be manufactured by general methods as described in the following paragraphs.

Examples of reactions which may be used for the manufacture of compounds of the invention, are the following:

(A) Reaction of an amine according to Formula II

II

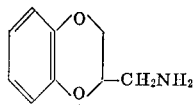

with a halide according to Formula III

III

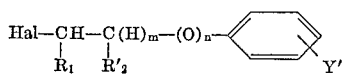

wherein $R_1$ is a hydrogen atom or a methyl group, Hal is a halogen atom, $R'_2$ is a hydrogen atom or a hydroxyl group, in which event $m=1$, or a double-bonded oxygen atom, in which event $m=0$ and in which event the keto group $>C-R'_2$, after the alkylating reactions, is converted by reduction into a carbinol group

$n$=zero or 1, provided that, if $R'_2$ is a hydroxy- or an oxo-group, $n$=zero and $Y'$ represents one or two methoxy- or hydroxy-groups, or one or two etherized or esterified hydroxy groups, which, after the alkylating reaction, are converted into free hydroxy groups by hydrolysis or hydrogenolysis, or $Y'$ is a methylene dioxy group.

(B) Deductive alkylation of an amine according to Formula II

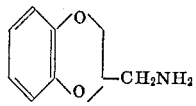

with a carbonyl compound II according to Formula IV

IV

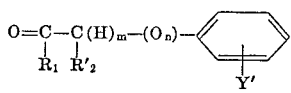

wherein $R_1$, $R'_2$, $Y'$, $m$ and $n$ designate the radicals specified in Formula IV.

The reductive alkylation may be carried out so that their intermediatelly-formed Schiff base is first prepared and then the reducing agent, preferably hydrogen is added in the presence of a metal catalyst, such as Pd, Pt or Ni. Preferably, however, the coupling reaction of the amine and carbonyl compound is effected in the presence of the reducing agent.

(C) Reaction of an amine according to Formula II with an acid anhydride or an acid halide according to Formula V, followed by reduction of the intermediately-formed acid amide

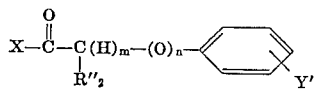

wherein X is a radical of the Formula VI

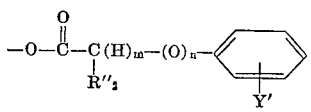

or a halogen atom, preferably a chlorine or bromine atom, $R''$ is a hydrogen atom, in which event $m=1$ and $n=0$ or 1, or a double bonded oxygen atom, in which event $m$ and $n$ are each zero, and $Y'$ is a radical specified for Formula III.

The reduction of the intermediately formed acid amide into the secondary amine is preferably carried out with the aid of a complex metal hydride or a metal alkyl hydride, such as, for example, $LiAlH_4$ or diisobutyl-aluminum hydride.

(D) Reaction of a halide according to Formula VII

VII

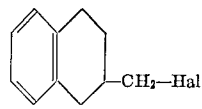

wherein Hal is a halogen atom, preferably a chlorine, a bromine or iodine atom with an amine according to Formula VIII.

VIII

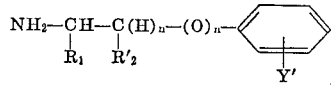

wherein $R_1$, $R'_2$, $m$, $n$ and $Y'$ are radicals specified for Formula IV.

Our invention will now be described in greater detail with reference to the following examples:

EXAMPLES

2-[{1-methyl-2-(4-hydroxyphenyl)ethylamino}methyl] benzodioxane-1,4

Formula IX

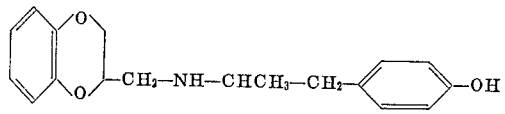

A solution consisting of 3.3 g. of 2-aminomethylbenzodioxane and 5.6 g. of (4-hydroxyphenyl) acetone in 96% ethanol was hydrated by the action of 0.1 g. of platinum oxide according to Adams at room temperature and a pressure of about 1.1 atm. until hydrogen was no longer absorbed. After removal of the catalyst the solution was provided with 26 ml. of 0.8 N hydrochloric acid and then concentrated in vacuo. The concentrate was provided with 15 cc. of water and again evaporated to about 20 g. Crystallization occurred after the addition of 25 ml. of ether. The crystal mass was vacuum filtered and recrystallized from about 15 ml. of water, to which ether was added after the crystal mass dissolved. The yield was 4.8 g. of the hydrochloride of a mixture of stereoisomers of the above-mentioned material. Another recrystallization yielded 2.90 g. with a melting point from 180° C. By adding ammonia to a solution of this hydrochloride in water, the base was obtained which, after having been recrystallized three times from a methanol-water mixture, yielded a product having a melting point from 122.5 to 123.5° C. This was one pure racemate of the two possible racemates. Its hydrochloride melted at 201° to 201.5° C.

2-[{1-methyl-2-hydroxy-2-(4-hydroxyphenyl)ethylamino)} methyl]benzodioxane-1,4

Formula X

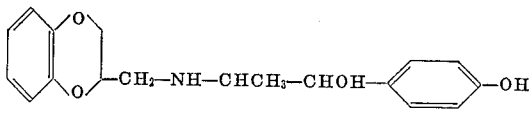

A solution consisting of 2.76 g. of 2-(aminomethyl) benzodioxane and 2.64 g. of 2-bromine-4'-benzyloxypropiophenone in 11 ml. of 96% ethanol was boiled for three hours. Then the solution was partly evaporated to dryness and mixed with 10 ml. of ether, whereafter the resulting crystalline deposit was vacuum filtered. The filtrate was mixed with 2 ml. of concentrated hydrochloric acid and 5 ml. of water, so that the hydrochloride of 4'-benzyloxy-2-{(2-benzodioxanyl-methyl)amino} propiophenone crystallized. This product was vacuum filtered, washed with ether and water, and dried in vacuo. The yield was 2.3 g. with a melting point of 195° C.

A solution of 2.46 g. of the resulting hydrochloride in about 27 ml. of 80% ethanol was hydrated by hydrogen with the aid of 0.5 g. of palladium on carbon catalyst at room temperature and a pressure of about 1.1 atm. As soon as the reduction was completed, the catalyst was removed by filtration and the filtrate evaporated in vacuo to about 4 g. The residue was dissolved in 3 ml. of water by heating. After cooling, the hydrochloride of a mixture of racemates of 2-[{1-methyl-2-hydroxy-2-(4-hydroxyphenyl)ethylamino}methyl]benzodioxane slowly crystallized therefrom. This white substance was vacuum filtered, washed with 5 mls. of water and dried in vacuo. Yield 1.2 g. The resultant substance contained 1 mol of water of crystallization per molecule and the anhydrous material melted between 178° and 180° C.

2-[{2-4-hydroxyphenyl)ethylamino}methyl]benzodioxane-1,4

Formula XI

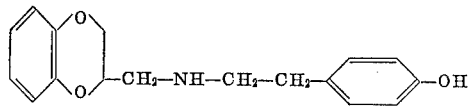

2.4 g. of 4-benzyloxyphenyl acetic acid were boiled under reflux with 3 cc. of thionylchloride in 25 cc. of absolute benzene for 1 hour. After evaporating in vacuo the benzene and the excess of thionylchloride, the residue was dissolved in 25 cc. of benzene. The solution was added to 3.1 g. of 2-(aminomethyl) benzodioxane dissolved in 20 mls. of benzene. After several hours the resulting 2 - [{2 - (4 - benzyloxyphenyl)acetamido} methyl]benzodioxane was filtered off, washed with water and dried in vacuo. Yield 2.65 g. of white material having a melting point from 121°–122° C.

1.6 g. of this amide were placed in an extraction cup above a solution of 1 g. of lithium-aluminum hydride in 40 cc. of absolute ether and then slowly extracted therefrom by boiling the ethereal solution. After 24 hours' boiling the amide was completely extracted and its reduction completed. The resulting complex was dissociated with 3 cc. of water while cooling with ice. The resulting hydroxides were vacuum filtered and washed with ether. The ethereal solutions were evaporated to dryness, whereafter a white crystalline substance resulted by adding 2.5 cc. of 2 N-hydrochloric acid. The resultant hydrochloride of 2-[{2-(4-benzyloxyphenyl)ethylamino}methyl]benzodioxane was vacuum filtered after standing for some time, washed with water and ether, and dried in vacuo above potassium hydroxide. Yield 1.43 g. having a melting point from 219°–220° C.

A suspension of 1.35 g. of the resulting hydrochloride in 50 cc. of alcohol was hydrated with hydrogen at room temperature and a pressure of about 1.1 atm. with the aid of a palladium on carbon catalyst. After completion of the hydration the catalyst was removed by filtration and the filtrate evaporated almost to dryness. A small amount of ether was added resulting in crystallization of hydrochloride of 2-[{2-(4-hydroxyphenyl ethylamino} methyl] benzodioxane which was still not pure. This salt was dissolved in a concentrated solution of caustic soda lye and from this solution a purer substance was obtained by evaporation to dryness. The substance which was still not pure was then crystallized twice from an alcohol ether mixture (1:1). Yield 0.5 having a melting point from 203.5°–204° C.

2-[{2-(2-methoxyphenoxy)ethylamino}methyl]benzodioxane-1,4

Formula XII

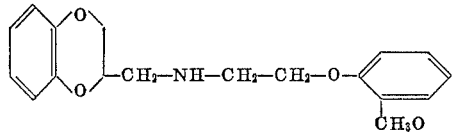

A mixture consisting of 1.84 g. of 2-(chloromethyl) benzodioxane, 1.84 g. of 2-(2-methoxyphenoxy) ethylamine and 2.0 g. of triethanolamine was maintained at a temperature of from 180° C. to 220° C. for 1.5 hours. Next, the reactive mixture was cooled and mixed with water. The resulting mixture was then extracted with the aid of ether three times, and finally the resulting ethereal solution was washed with water another time.

By shaking the ethereal solution with 10 mls. of 2 N hydrochloric acid the hydrochloride of the above-mentioned substance spontaneously crystallized out. This hydrochloride was vacuum filtered and washed with ether and water. After three crystallizations from isopropanol ether, followed by crystallization from water, 0.6 g. of a material was obtained which contained water of crystallization and as such melted from 109° to 111° C.

2-[{1-methyl-2-(3,4-methylenedioxyphenyl)ethylamino}methyl]benzodioxane-1,4

Formula XIII

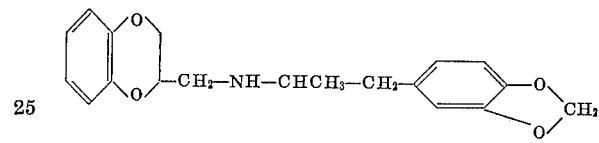

A solution consisting of 2 g. of 1-methyl-2-(3,4-methylenedioxyphenyl) ethylamine and 0.9 g. of 2-(chloromethyl)benzodioxane in 10 mls. of dimethylformamide was boiled for about 6 hours. Next, to the reactive mixture, sodium hydroxide there were added 40 cc. of water and 5 ml. of 2 N lye and it was then extracted twice with the aid of ether. The ethereal solution was shaken with 5 ml. of 2 N hydrochloric acid, resulting after some time in crystallization. The resultant crystal mass, which also contained tar-like constituents, was vacuum filtered, washed with water and ether, and then with acetone so that any non-crystalline substance was completely removed. The yield was 0.36 g. of the hydrochloride of the above-mentioned product having a melting point from 182°–187° C.

2-[{1-methyl-2-(4-methoxyphenyl)ethylamino}-methyl]benzodioxane-1,4

Formula XIV

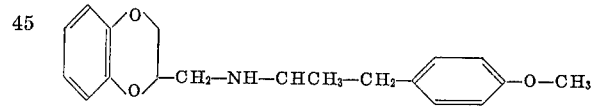

A mixture of 4.7 g. of 2-chloromethylbenzodioxane, 4.5 g. of 1-methyl-2-(4-methoxyphenyl)ethylamine and 4.5 g. of triethanolamine was heated for 100 minutes at ca. 190° C. After cooling the reaction mixture was shaken with water and ether and the aqueous layer separated from the ethereal one. The aqueous solution was extracted once again with ether whereupon the collected ethereal solutions were washed with some water. Then the ethereal solution was shaken with 20 ml. of 2 N hydrochloric acid. This resulted in the separation of a heavy black syrup from the mixture. This syrup was washed with some water and ether and, after removal of these solvents, crystallized from 25 ml. of isopropanol. Yield 2.8 g. of crystals, melting at 155–156° C. This is the hydrochloride of the above-mentioned product. It was recrystallized from 10 ml. of isopropanol, giving 2.1 g. of a product melting at 155.5–156.5° C.

2-[{1-methyl-2(2-methoxyphenyl)ethylamino}-methyl benzodioxane-1,4

Formula XV

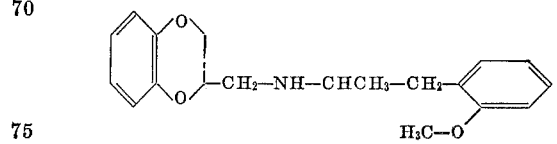

A mixture of 2.54 g. of 1-methyl-2-(2-methoxyphenyl) ethylamine, 2.65 g. of 2-chloromethylbenzodioxane and 2.54 g. of triethanolamine was heated for 2 hours between 185 and 210° C. After cooling the reaction mixture was mixed with some water and ether and the formed layers separated. The aqueous layer was extracted with some ether whereupon the collected ether layers were washed with some water. After adding 20 ml. of 2 N hydrochloric acid to the ethereal layer a brown oil separated, containing the hydrochloride of the above-mentioned product. The oil was dissolved in isopropanol and crystallized by adding double the volume of ether to this solution. Yield 1.76 g. crystals, melting 156–160° C. One recrystallization from isopropanol ether gave 1.6 g., melting 157–160° C.

2-[{2-(3-hydroxyphenyl)ethylamino}methyl]-benzodioxane-1,4-hydrochloride

Formula XVIII

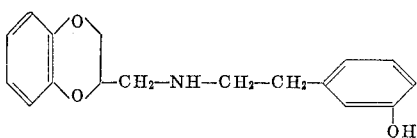

A solution of 12.8 g. of 2-(3-benzyloxyphenyl)ethylamine and 4.8 g. of 2-chloromethylbenzodioxane-1,4 in 15 ml. of butylcellosolve was refluxed for 12.5 hours. After cooling 50 ml. of water and 50 ml. of ether were added to the mixture. The mixture was shaken, the layers separated and the ether layer was washed once again with 50 ml. of water. Then 7 ml. of 3.8 N alcoholic hydrochloric acid was added to the ethereal solution. After diluting this solution with 200 ml. of ether 8.04 g. of 2[{2-(3 - benzyloxyphenyl)ethylamino}methyl]benzodioxane-1.4 hydrochloride melting at 180–182° C. (sintering at 168° C.) was obtained.

A suspension of 5.3 g. of this 2[{2-(3-benzyloxyphenyl)ethylamino}methyl]-benzodioxane-1,4 hydrochloride in 100 ml. of ethanol was hydrogenated at room temperature with the aid of a palladium on carbon catalyst. When the hydrogenation is ready, the mixture is filtered and the filtrate is concentrated in vacuo to dryness. By dissolving the residue in 60 ml. of ethanol and adding 100 ml. of ether 2.70 g. of the above mentioned hydrochloride crystallized. It was separated and dried, giving a product melting at 205–207° C. $ED_{50}$=6.8.

2[{2-(4-hydroxyphenoxy)ethylamino}methyl] benzodioxane-1,4 hydrochloride

Formula XIX

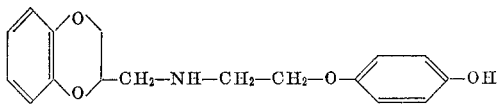

A solution of 12.8 g. of 2-aminomethylbenzodioxane-1,4 and 11.9 g. of 2-(4-benzyloxyphenoxy)ethylbromide [1]) in 35 ml. of butylcellosolve was refluxed for 8 hours. After cooling to room temperature 75 ml. of water and 75 ml. of ether were added to this mixture. The undissolved material consisted of 4.15 g. crude hydrobromide of the reaction product. It was removed by filtration and from the filtrate the layers were separated. The ethereal layer was washed with 50 ml. of water and then acidified with 10 ml. of 3.8 N alcoholic hydrochloric acid. 7.28 g. of 2[{2-(4 - benzyloxyphenoxy)ethylamino} methyl]-benzodioxane-1,4 hydrochloride crystallized and was separated (melting point 217–218° C.).

[1] Bull. Soc. chim.

A suspension of 6.4 g. of this 2[{2-(4-benzyloxyphenoxy)ethylamino} methyl]-benzodioxane-1,4 hydrochloride in 100 ml. of ethanol was hydrogenated at about 35° C. with a palladium on carbon catalyst. When the benzyl group was removed, the hydrogenation was stopped. The mixture was filtered and the filtrate concentrated in vacuo to 35 g. After cooling 4.0 g. of 2[{2-(4-hydroxyphenoxy) ethylamino} methyl] - benzodioxane-1,4 hydrochloride crystallized. Melting point 196–198° C. $ED_{50}$=13.3.

2-[{2-(3,4-dihydroxyphenyl)ethylamino}methyl]-benzodioxane-1,4 hydrochloride

Formula XX

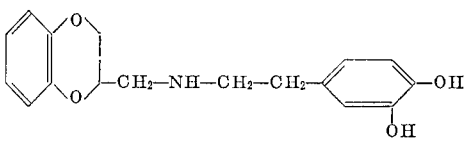

A solution of 18.37 g. of 2-(3,4-dibenzyloxyphenyl) ethylamine and 5.08 g. of 2-chloromethylbenzodioxane-1,4 in 25 ml. of butylcellosolve was refluxed for 13 hours. After cooling 75 ml. of water and 75 ml. of ether were added to the reaction mixture. The ether layer was washed with another portion of 50 ml. of water and then acidified with 8 ml. of 3.8 N alcoholic hydrochloric acid. By diluting this acidified solution with 400 ml. of ether 8.95 g. of 2-[{2 - (3,4 - dibenzyloxyphenyl)-ethylamino}methyl]-benzodioxane-1,4 hydrochloride separated (M.P. 180–181.5° C).

A suspension of 7.88 g. of this 2[{2-(3,4-dibenzyloxyphenyl) ethylamino} methyl]-benzodioxane-1,4 hydrochloride in 100 ml. of ethanol was hydrogenated with the aid of a palladium on carbon catalyst at about 35° C. When the benzyloxy groups were hydrogenolyzed, the hydrogenation was stopped and the catalyst removed by filtration. The filtrate was concentrated in vacuo till a 15 g. residue. By diluting this residue with some ether an oil precipitated consisting of the hydrochloride of the above mentioned product and some solvent. The oil was separated. After removing the solvents from it in vacuo a solid mass remained of the above mentioned product. $ED_{50}$=10.0.

2-[{2-(3,4-dimethoxyphenyl)-ethylamino} methyl]-benzodioxane-1,4 hydrochloride

Formula XXI

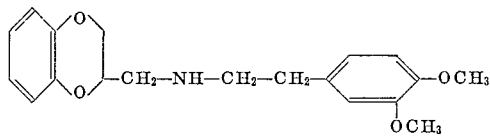

A solution of 11.85 g. of 2-(3,4-dimethoxyphenyl)-ethylamine and 6.04 g. of 2-chloromethylbenzodioxane-1,4 was refluxed for 12.5 hours. After cooling to room temperature 50 ml. of water and 50 ml. of ether were added to the mixture. After shaking and separating the layers, the ether layer was washed again with 50 ml. of water. By acidifying the ether layer with 9 ml. of 3.8 N alcoholic hydrochloric acid and diluting this solution with 100 ml. of ether, the product mentioned above crystallized. It was filtered, washed with some acetone and ether and dried. Yield 5.14 g., melting point 175–176° C.

Injection liquid.—70 litres of distilled water and 2.5 kg. of glycerine were introduced into a mixing kettle. Next, 0.5 kg. of the salt obtained in accordance with Example I dissolved in 10 litres of distilled water was added while stirring. Then the contents of the mixing kettle were bought to 100 liters by the addition of distilled water. The resultant injection liquid obtained after thoroughly stirring was then used to fill ampules each containing 2 ml. of the injection liquid.

Tablets containing the compounds according to the invention as an active substance may consist, for example, of 50 mg. of the active substance
112 mg. of milk sugar
50 mg. of potato starch
10 mg. of talc
3 mg. of magnesium stearate.

While we have described our invention in connection with specific embodiments and applications, other modifications thereof will be readily apparent to those skilled in this art without departing from the spirit and scope of the invention.

What we claim is:
1. A benzodioxane derivative of the formula:

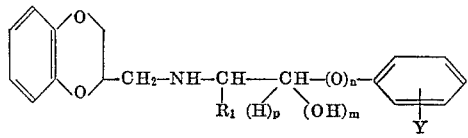

wherein $R_1$ is a member selected from the group consisting of hydrogen and methyl, Y is methylene dioxy, $m$, $n$ and $p$ are each whole numbers from 0 to 1, the sum of $p+m$ is 1 and the salts thereof with pharmaceutically acceptable acids.

References Cited

UNITED STATES PATENTS 3,170,933   2/1965   Schmidt _____ 360—340.3

FOREIGN PATENTS 1,405,494   6/1964   France.

ALEX MAZEL, *Primary Examiner.*

JAMES H. TURNIPSEED, *Assistant Examiner.*

U.S. Cl. X.R.

260—340.3; 424—278

PO-1050
(5/69)

UNITED STATES PATENT OFFICE
CERTIFICATE OF CORRECTION

Patent No. 3,444,210      Dated     May 13, 1969

Inventor(s)    Hendrik Durk Moed et al     PH 17,832B

It is certified that error appears in the above-identified patent and that said Letters Patent are hereby corrected as shown below:

Column 1, lines 5 and 6, "to North American Philips Company, Inc.," should read -- by mesne assignments, to U.S. Philips Corporation--.

Signed and sealed this 14th day of July 1970.

(SEAL)
Attest:

Edward M. Fletcher, Jr.
Attesting Officer

WILLIAM E. SCHUYLER, JR.
Commissioner of Patents